(12) United States Patent
Lee et al.

(10) Patent No.: US 11,719,888 B2
(45) Date of Patent: Aug. 8, 2023

(54) FIBER OPTIC ADAPTOR

(71) Applicant: Gloriole Electroptic Technology Corp., Kaohsiung (TW)

(72) Inventors: Yen-Chang Lee, Kaohsiung (TW); Hsien-Hsin Hsu, Kaohsiung (TW); Jim Lin, Kaohsiung (TW); Ke Xue Ning, Shenzhen (CN)

(73) Assignee: GLORIOLE ELECTROPTIC TECHNOLOGY CORP., Kaohsiung (TW)

( * ) Notice: Subject to any disclaimer, the term of this patent is extended or adjusted under 35 U.S.C. 154(b) by 0 days.

(21) Appl. No.: 17/678,448

(22) Filed: Feb. 23, 2022

(65) Prior Publication Data

US 2023/0003945 A1 Jan. 5, 2023

(30) Foreign Application Priority Data

Jul. 5, 2021 (TW) .................................. 110207824

(51) Int. Cl.
*G02B 6/38* (2006.01)
(52) U.S. Cl.
CPC ........... *G02B 6/3825* (2013.01); *G02B 6/387* (2013.01); *G02B 6/389* (2013.01)

(58) Field of Classification Search
CPC ................................ G02B 6/387; G02B 6/389
See application file for complete search history.

(56) References Cited

U.S. PATENT DOCUMENTS

| 8,676,022 | B2* | 3/2014 | Jones | G02B 6/3849 385/139 |
| 2001/0026661 | A1* | 10/2001 | de Jong | G02B 6/3831 385/56 |
| 2015/0003785 | A1* | 1/2015 | Raven | G02B 6/3825 385/62 |
| 2015/0241644 | A1* | 8/2015 | Lee | G02B 6/3831 385/76 |

* cited by examiner

*Primary Examiner* — Sung H Pak
(74) *Attorney, Agent, or Firm* — Muncy, Geissler, Olds & Lowe, P.C.

(57) ABSTRACT

A fiber optic adaptor includes a main shell body and an outer cover. The main shell body has a first end portion and a second end portion. The first end portion defines a first opening and is formed with two engaging grooves. The outer cover is removably disposed on and covering the first end portion, and has a cover body portion, two locking clips, and an identifier portion. The two locking clips protrudes from the cover and respectively engage the engaging grooves. The identifier portion is disposed on the cover body portion. The locking clips are operable to be removed respectively from the engaging grooves. The cover body portion defines a port outer opening, and a port key portion.

1 Claim, 4 Drawing Sheets

FIBER OPTIC ADAPTOR

CROSS-REFERENCE TO RELATED APPLICATION

This application claims priority to Taiwanese Utility Model Patent Application No. 110207824, filed on Jul. 5, 2021.

FIELD

The disclosure relates to an adaptor, and more particularly to a fiber optic adaptor for connecting fiber optic connectors.

BACKGROUND

Referring to FIG. 1, two ends of a conventional fiber optic adaptor 1 are respectively provided for insertion of two fiber optic connectors (or other devices), so that the fiber optic connectors are connected to each other via the fiber optic adaptor 1, thereby achieving the purpose of signal transmission. Some types of fiber optic connectors have multiple core heads. When the core heads of the fiber optic connectors are mated in a different order the polarity may be changed, and a variety of connection methods may be obtained. It is usual for front ends of the fiber optic adaptor to be provided with an upwardly protruding polarity key which acts to mark the order of the core heads and display the current polarity.

However, the conventional fiber optic adaptor 1 is integrally formed, and a position of a key receptacle 11 of the conventional fiber optic adaptor used for the insertion of a polarity key of the fiber optic connector cannot be changed. Therefore, when the polarity of each fiber optic connector needs to be reversed, the fiber optic connector first needs to be disconnected, and a tool is needed to remove the polarity key, in order to change the position of the polarity key on the fiber optic connector, until finally the fiber optic connector is reconnected to the fiber optic adaptor 1. The detachment method for switching polarity described above is quite complex, and furthermore, the polarity key is not only difficult to disassemble, but also easily to lose because of its small size. Furthermore, after the fiber optic connector is inserted into the fiber optic adaptor 1, it is difficult to see the polarity of the fiber optic connector. Therefore the conventional fiber optic adaptor is inconvenient.

SUMMARY

Therefore, an object of the disclosure is to provide a fiber optic adaptor that can alleviate at least one of the drawbacks of the prior art.

According to the disclosure, a fiber optic adaptor includes a main shell body and an outer cover. The main shell body defines an inner passage extending in a front-rear direction. The main shell body further has a first end portion defining a first opening that communicates with the inner passage, and a second end portion defining a second opening that communicates with the inner passage. The first end portion is formed with two engaging grooves that are opposite to each other in a left-right direction perpendicular to the front-rear direction. The outer cover is removably disposed on and covers the first end portion, and has a cover body portion, two locking clips, and an identifier portion. The two locking clips protrude from the cover body portion in the front-rear direction and respectively engage the engaging grooves. The identifier portion is disposed on the cover body portion. The locking clips are operable to be removed respectively from the engaging grooves. The cover body portion defines a port outer opening that communicates with the first opening, and a port key portion that communicates with the port outer opening. The port outer opening and the port key portion are arranged in an up-down direction which is perpendicular to the front-rear direction and the left-right direction. The identifier portion is located at an upper outer side of the port key portion when the outer cover is coupled to the first end portion with the port key portion being over the port outer opening, and the identifier portion is located at a lower outer side of the port key portion when the outer cover is coupled to the first end portion with the port key portion being under the port outer opening.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
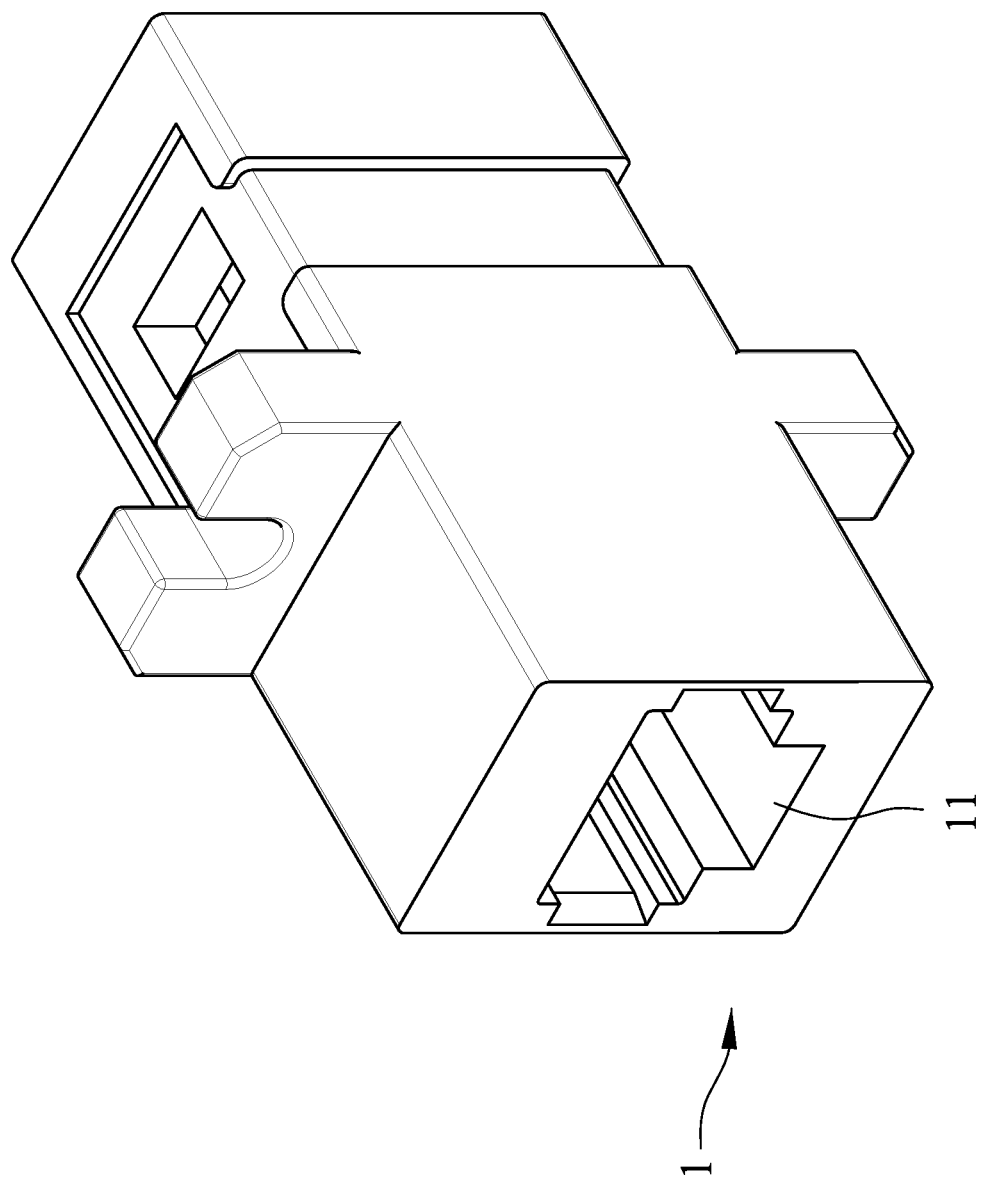
FIG. 1 is a perspective view of an embodiment of a conventional fiber optic adaptor.
Figure 2:
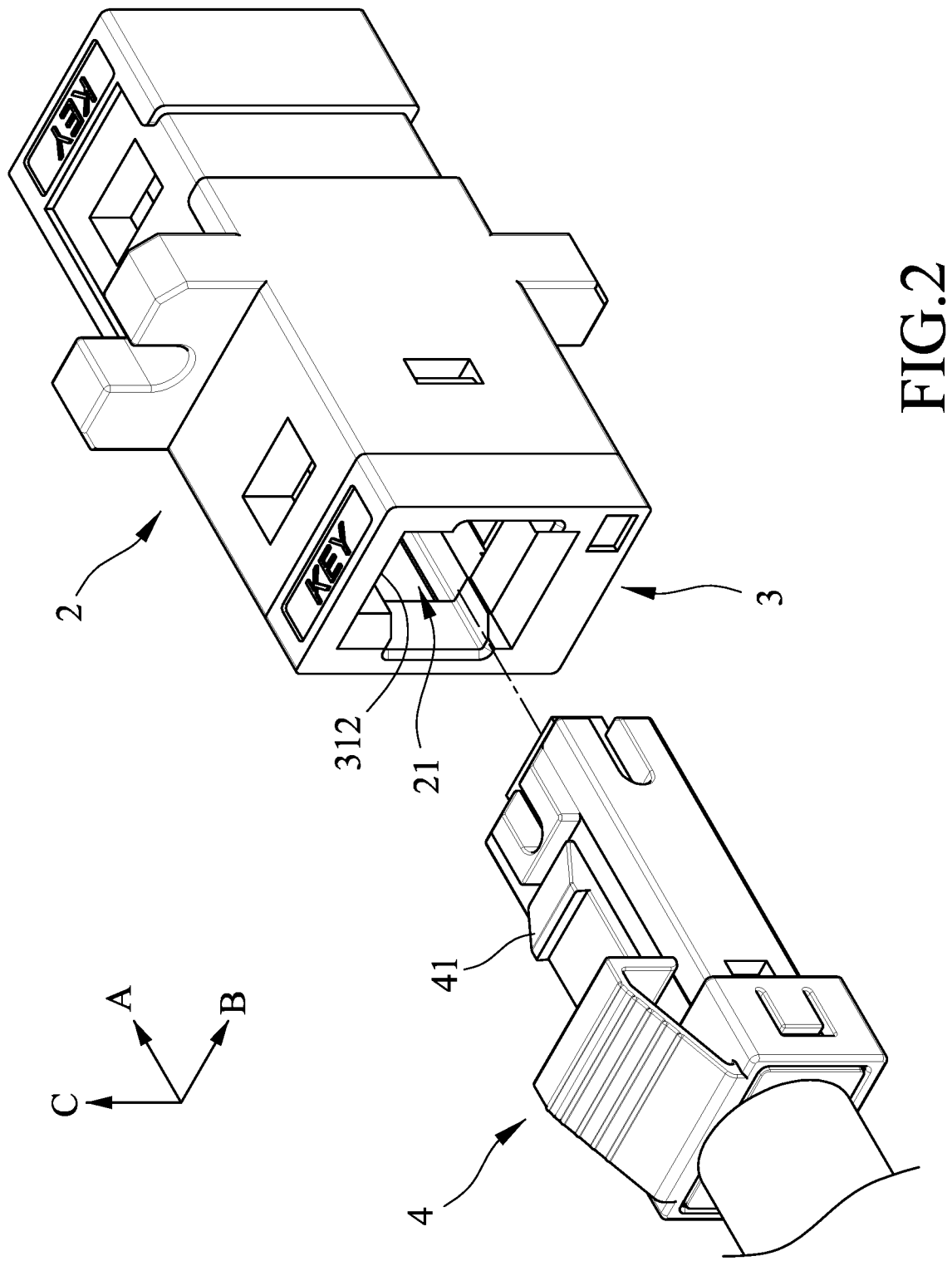
FIG. 2 is a perspective view of an embodiment of a fiber optic adaptor according to the present disclosure.
Figure 3:
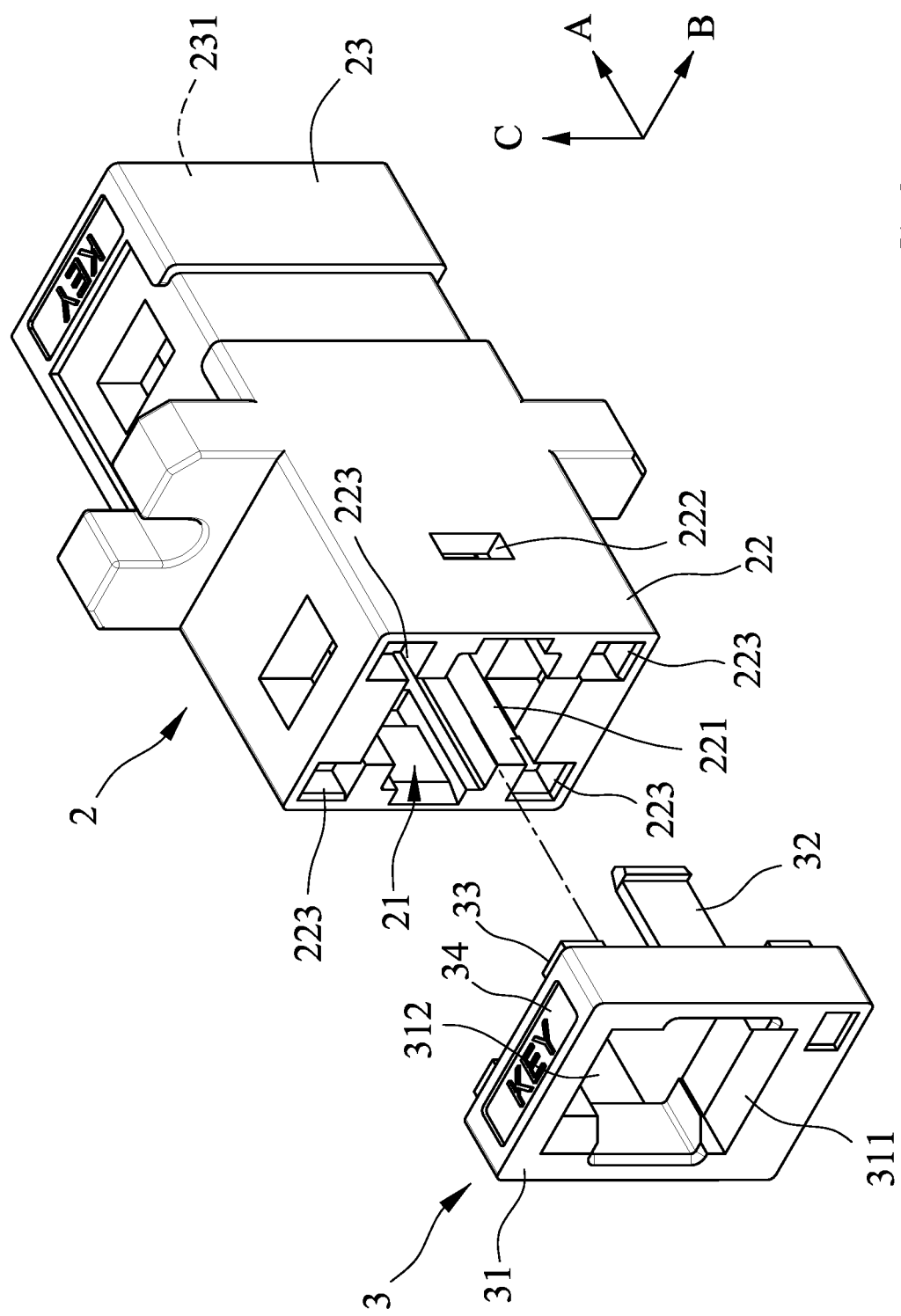
FIG. 3 is an exploded perspective view, illustrating arrangements of components of the embodiment.
Figure 4:
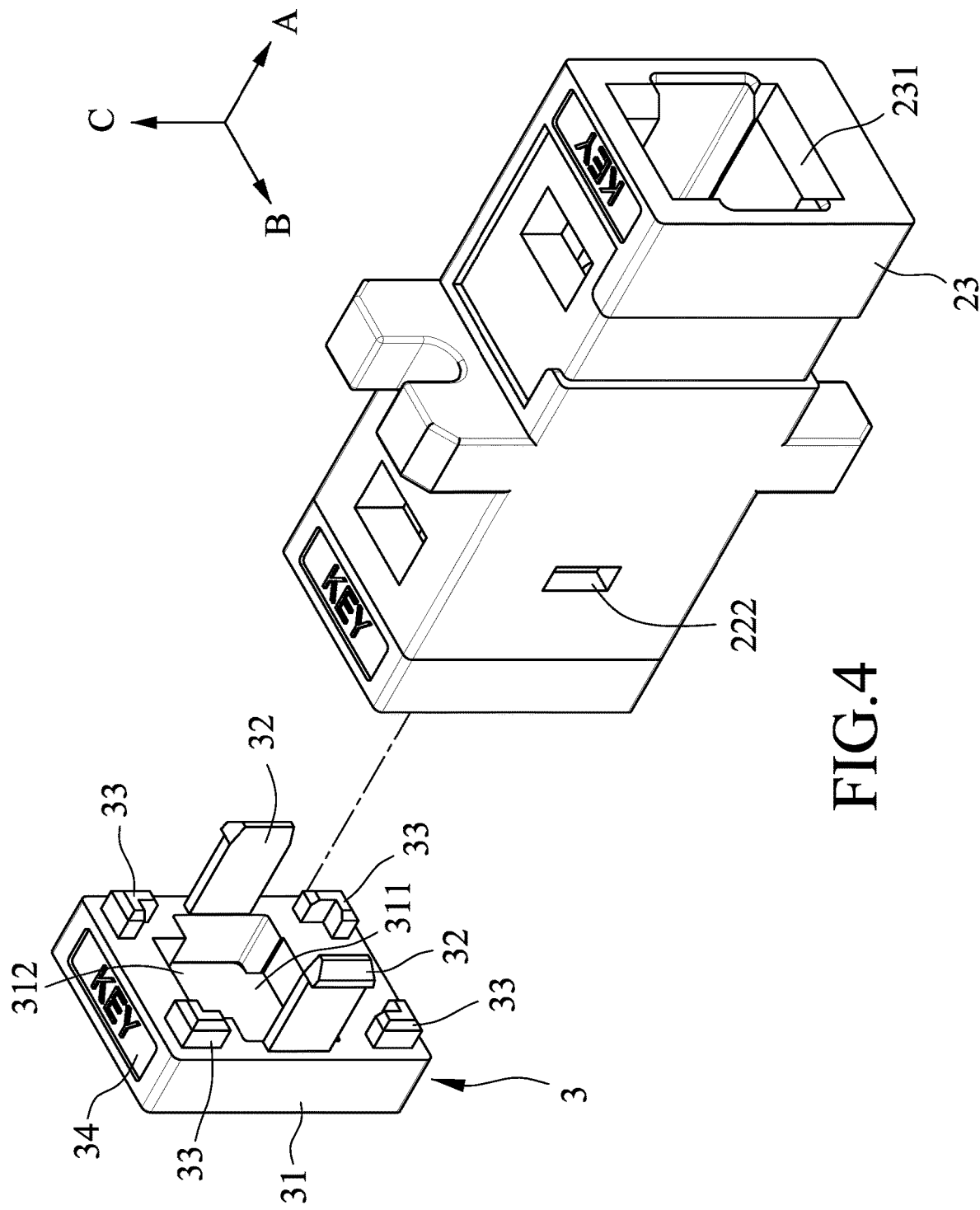
FIG. 4 is an exploded perspective view illustrating arrangement of components of the embodiment from another angle.

Referring to FIGS. 2, 3 and 4, an embodiment of the fiber optic adaptor according to the present disclosure is shown.

The fiber optic adaptor includes a main shell body 2 surrounding and defining an inner passage 21 that extends in a front-rear direction (A), and an outer cover 3. The main shell body 2 has a first end portion 22 that defines a first opening 221 communicating with the inner passage 21, and a second end portion 23 that is opposite to the first end portion 22 in the front-rear direction (A) and that surrounds and defines a second opening 231 communicating with the inner passage 21. The first and second openings 221, 231 are located at two ends of the inner passage 21 in the front-rear direction (A), and are communicated with each other. The first end portion 22 is formed with two engaging grooves 222 that are opposite to each other in a left-right direction (B) perpendicular to the front-rear direction (A) and that are in spatial communication with the inner passage 21, and a plurality of positioning holes 223 that are disposed around the first opening 221, and that extend inwardly from an outer end surface thereof in the front-rear direction (A).

The outer cover 3 is removably disposed on and covers the first end portion 22, and has a cover body portion 31 that surrounds and defines a port outer opening 311 and a port key portion 312, two locking clips 32 that protrude from the cover body portion 31 in the front-rear direction (A), a plurality of positioning post portions 33 that extend from the cover body portion 31 in the front-rear direction (A) (i.e., in the same direction as the locking clips 32), and an identifier portion 34 that is displayed on the cover body portion 31. The port outer opening portion 311 and the port key portion 312 are arranged in an up-down direction (C) which is perpendicular to the front-rear direction (A) and the left-right direction (B), communicate with each other, and are both in communication with the first opening 221 so as to communicate with the inner passage 21. In this embodiment, the outer cover 3 has four positioning post portions 33, and the first end portion 22 of the main shell body 2 has four positioning holes 223. The locking clips 32 extend through the first opening 221 into the inner passage 21, and respectively engage the engaging grooves 222. The locking clips 32 are operable to be removed respectively from the engaging grooves 222. Through this, the outer cover 3 can be fixed to the main shell body 2 and removed from the main shell body 2. The positioning post portions 33 are respectively inserted into the positioning holes 223 such that the cover body portion 31 does not move relative to the first end portion 22 in the left-right direction (B) and the up-down direction (C), thereby achieving the effect of a secure fixing. In this embodiment, the cross section of each positioning post portion 33 perpendicular to the front-rear direction (A) is substantially L-shaped, but is not limited thereto. The identifier portion 34 can be displayed on the cover body portion 31 through an engraving or an adhesive attachment, etc., and is located externally of the port key portion 312 so as to mark the position of the port key portion 312.

A fiber optic connector 4 having a polarity key 41 can be inserted into the fiber optic adaptor according to this disclosure. A main body of the fiber optic connector 4 is inserted into the inner passage 21 through the port outer opening 311 and the first opening 221, and the polarity key 41 is inserted into the port key portion 312. When polarity is to be reversed, a user only needs to remove the fiber optic connector 4 and turning the fiber optic connector 4 upside down, then decouple the outer cover 3 from the main shell body 2 by retracting the locking clips 32 from the engaging grooves 222.

And afterwards the user turns the outer cover 3 upside down and re-couple the outer cover 3 with the main shell body 2. At this time the port key portion 312 has also been inverted along with the outer cover 3.

Finally, the fiber optic connector 4 that has been turned upside down as mentioned previously is inserted into the main shell body 2 of the fiber optic adaptor. During the insertion, the polarity key 41 which was turned upside down can be inserted into the port key portion 312 which was also turned upside down as mention above. Therefore, polarity can be changed quickly and easily, and the polarity can be labelled in the correct position.

The identifier portion 34 may be a relief, imprint or sticker that is labelled "KEY" (or other text, patterns, signs) that correspond to the outside of the port key portion 312.

When the fiber optic connector 4 is inserted into the fiber optic adaptor of the present embodiment, the user can confirm a position of the port key portion 312 through the identifier portion 34 that is externally visible, thereby determining the polarity. More specifically, the identifier portion 34 is located at an upper outer side of the port key portion 312 when the outer cover 3 is coupled to the first end portion 22 with the port key portion 312 being over the port outer opening 311, and the identifier portion 34 is located at a lower outer side of the port key portion 312 when the outer cover 3 is coupled to the first end portion 22 with the port key portion 312 being under the port outer opening 311. Therefore the polarity of the fiber optic adaptor can be easily identified and changing of polarity can be conveniently accomplished.

In addition, the second opening 231 is capable for insertion of another fiber optic connector (not shown) so that the two fiber optic connectors are signally connected.

In summary, through the design of the outer cover 3 that can be turned upside down relative to the main shell body 2, the fiber optic adaptor according to this disclosure can allow a fiber optic connector to quickly change polarity by being turned upside down and reconnecting. Furthermore, the identifier portion 34 is visible on the exterior of the fiber optic adaptor and allows a user to determine the current polarity. The polarity change is simple, so the object of this invention can be certainly achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:
1. A fiber optic adaptor comprising:
a main shell body defining an inner passage that extends in a front-rear direction, and having a first end portion that defines a first opening communicating with said inner passage, and a second end portion that defines a second opening communicating with said inner passage, said first end portion being formed with two engaging grooves that are opposite to each other in a left-right direction perpendicular to the front-rear direction; and
an outer cover removably disposed on and covering said first end portion, and having a cover body portion, two locking clips that protrude from said cover body portion in the front-rear direction and that respectively engage said engaging grooves, and an identifier portion that is disposed on said cover body portion, said locking clips being operable to be removed respectively from said engaging grooves, said cover body portion defining a port outer opening that communicates with said first opening, and a port key portion that communicates with said port outer opening, said port outer opening and said port key portion being arranged in an up-down direction which is perpendicular to the front-rear direction and the left-right direction;
wherein said identifier portion is located at an upper outer side of said port key portion when said outer cover is coupled to said first end portion with said port key portion being over said port outer opening, and said identifier portion is located at a lower outer side of said port key portion when said outer cover is coupled to said first end portion with said port key portion being under said port outer opening;

wherein said first end portion of said main shell body is further formed with a plurality of positioning holes that are disposed around said first opening, and that extend inwardly from an outer end surface thereof in the front-rear direction; and wherein said outer cover further has a plurality of positioning post portions that extend in the front-rear direction and that are respectively inserted into said positioning holes, and a cross section of each positioning post portion perpendicular to the front-rear direction is substantially L-shaped.

\* \* \* \* \*